(12) United States Patent
Yoon

(10) Patent No.: US 6,330,457 B1
(45) Date of Patent: Dec. 11, 2001

(54) TELEPHONE CALL SERVICE BY SENSING HAND-HELD STATE OF CELLULAR TELEPHONE

(75) Inventor: Jang Sub Yoon, Kyonggi-do (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/362,690

(22) Filed: Jul. 29, 1999

(30) Foreign Application Priority Data

Jul. 31, 1998 (KR) .................................................. 98-31315

(51) Int. Cl.[7] ................................ H04B 1/38; H04M 1/00
(52) U.S. Cl. .................... 455/550; 455/567; 455/556; 455/458; 379/419
(58) Field of Search ........................... 455/567, 556, 455/550, 458; 379/419

(56) References Cited

U.S. PATENT DOCUMENTS

| 5,884,156 | * | 3/1999 | Gordon | 455/350 |
| 6,002,763 | * | 12/1999 | Lester et al. | 379/421 |
| 6,181,267 | * | 1/2001 | Gehlot | 340/407 |
| 6,246,761 | * | 6/2001 | Cuddy | 379/418 |
| 6,246,862 | * | 1/2001 | Grivas | 455/90 |

* cited by examiner

Primary Examiner—William Trost
Assistant Examiner—Sheila Smith
(74) Attorney, Agent, or Firm—Fleshner & Kim, LLP

(57) ABSTRACT

A phone call service based upon sensing a hand-held state of a cellular phone is disclosed According to the present invention, a user may receive and terminate a call by holding or not holding the phone, thereby allowing the user to receive a more convenient phone call service.

14 Claims, 3 Drawing Sheets

TELEPHONE CALL SERVICE BY SENSING HAND-HELD STATE OF CELLULAR TELEPHONE

Field of the Invention

The present invention relates to cellular telephones, and more particularly to a method for sensing whether a cellular phone is held in a user's hand to provide a convenient phone call service.

Discussion of the Related Art

In addition to the basic transmission and reception functions, a cellular phone may have a variety of supplementary functions such as time display, memory and transmission/reception signal selection.

FIG. 1 shows a conventional cellular phone comprising an antenna 10 transmitting and receiving radio signals; a duplexer 20 integrating the transmission and reception paths into a single path to enable a bidirectional communication via the antenna 10; a receiver 30 processing and separating a radio signal received through the antenna 10 into an audio signal and control data for the processing of the received signal. A CPU 40 processes the data from the receiver 30 and also processes the data to be transmitted. A transmitter 50 processes input audio signals and the data from the CPU 40 for the transmission of a signal via the antenna 10.

A memory unit 60 stores various information necessary for the CPU 40 to process the data. The memory unit 60 may be, for example, a random access memory (RAM). Also, an image display 70 provides a visual display of data to the user. A microphone 80 converts a user's voice into an electrical signal as input audio signals and a speaker 90 converts an electrical signal, i.e. the audio signal, from the receiver 30 into a vibration such that a voice can be heard by the user. A keypad 100 allows user interaction by including a plurality of buttons to input various data and a power supply 110 supplies power to the cellular phone.

The operation of the conventional cellular phone in FIG. 1 will next be described. When a call comes in to a cellular phone, a base station detects the origination of the call and transmits a signal indicating a presence of the phone call to the cellular phone. Subsequently, a radio paging signal is received by the antenna 10 of the cellular phone and is processed by the receiver 30 such that the signal is separated into an audio signal and data for the processing of the received signal.

In response to the data output from the receiver 30, the CPU 40 confirms that the incoming call is for the cellular phone and informs the user of the phone call through the speaker 90 and image display 70. If the user responds to the incoming call, the CPU 40 generates data to be generated and transfers the data to the transmitter 50. The data generated by the CPU 40 is processed by the transmitter 50 and transmitted to the base station as the response to the incoming call via the antenna 10. Moreover, the CPU 40 opens a speech path through the speaker 90 and microphone 80 to enable the phone call.

On the other hand, when the user wishes to make a phone call and enters a phone number on the keypad 100, the outgoing call origination information is processed by the CPU 40 and transmitted to the base station via the transmitter 50 and antenna 10. Thereafter, upon receiving a response to the call via the antenna 10, receiver 30 and the CPU 50 opens a speech path through the speaker 90 and microphone 80 to enable a phone call.

In the conventional cellular phone, the user must manually input data to either start or stop a phone call. Thus, the user must usually pick up the cellular phone and push a button or physically maneuver the phone in a particular way to enter the data to start or stop a phone conversation. However, the user may often be a situation where it is difficult or inconvenient to enter such data. For this reason, the conventional cellular phone cannot provide a convenient phone call service.

Objectives of the Invention

An object of the present invention is to solve at least the problems and disadvantages of the related art.

An object of the present invention is to provide a convenient phone call service for a cellular phone.

Another object of the present invention is to provide a phone call service by which a call can be started or stopped without the necessity to enter surplus data to start or stop a call. It is the object of the present invention to automatically start or stop a phone call based upon sensing a hand-held state of a cellular phone.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, the present invention comprises (a) determining whether a user is holding the cellular phone when a call comes through under the condition when the cellular phone is at a call origination/termination wait status; (b) opening a speech path to maintain a phone call status, if it is determined that the user is holding the cellular phone; (c) determining whether the user has removed the cellular phone from his/her hand, while maintaining the phone call status; and (d) recognizing that a request to stop the phone call has been generated, if it is determined that the user has removed the cellular phone from his/her hand, and closing the speech path to return to the call origination/termination wait status.

Preferably, a hand-held state sensor is provided in the cellular phone to sense whether the user is holding the cellular phone. The hand-held state sensor may include at least one of a temperature sensor, a pressure sensor, a fingerprint sensor and/or a scanning beam interception sensor.

Brief Description of the Drawing

The invention will be described in detail with reference to the following drawings in which like reference numerals refer to like elements wherein.

Detailed Description of the Invention

Figure 1:
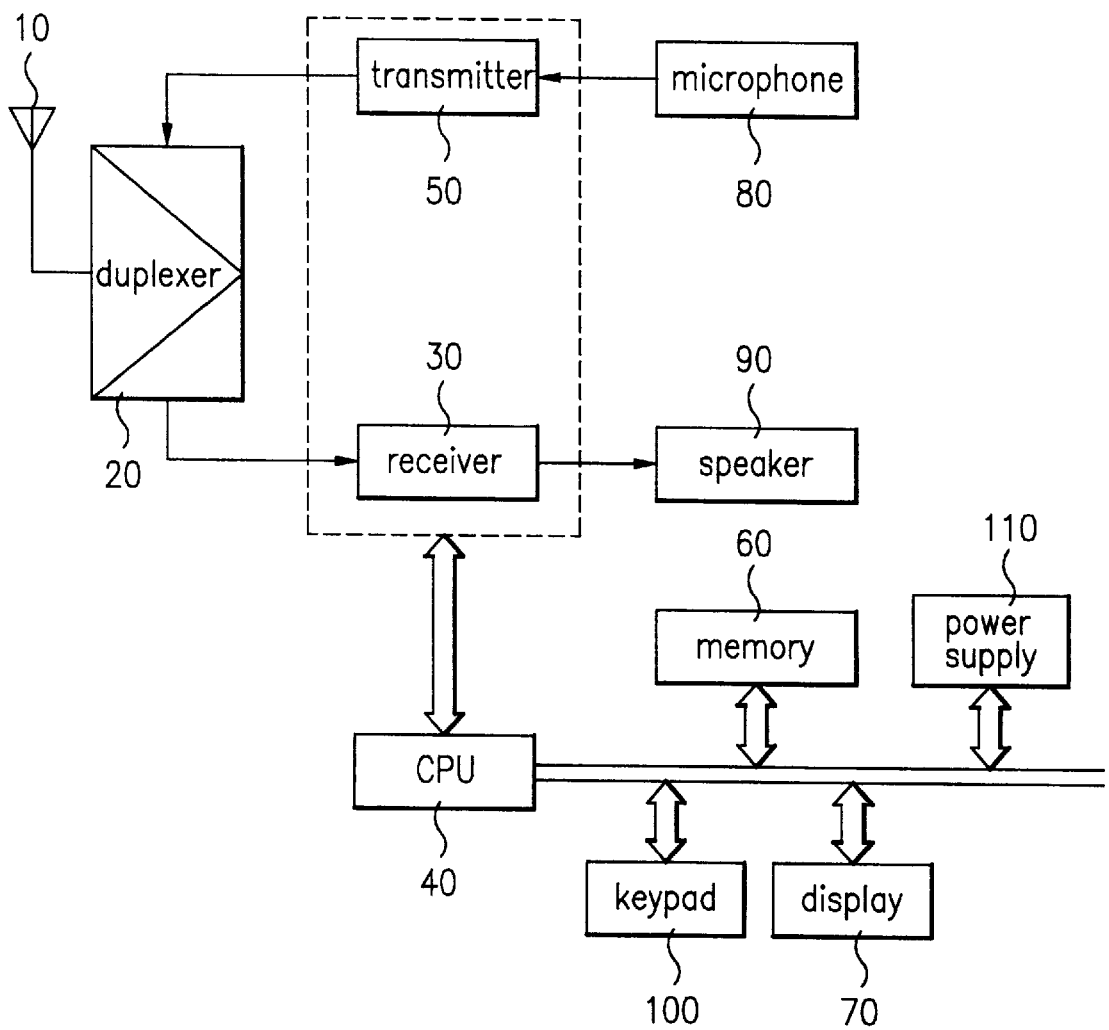
FIG. 1 is a block diagram of a conventional cellular phone.
Figure 2:
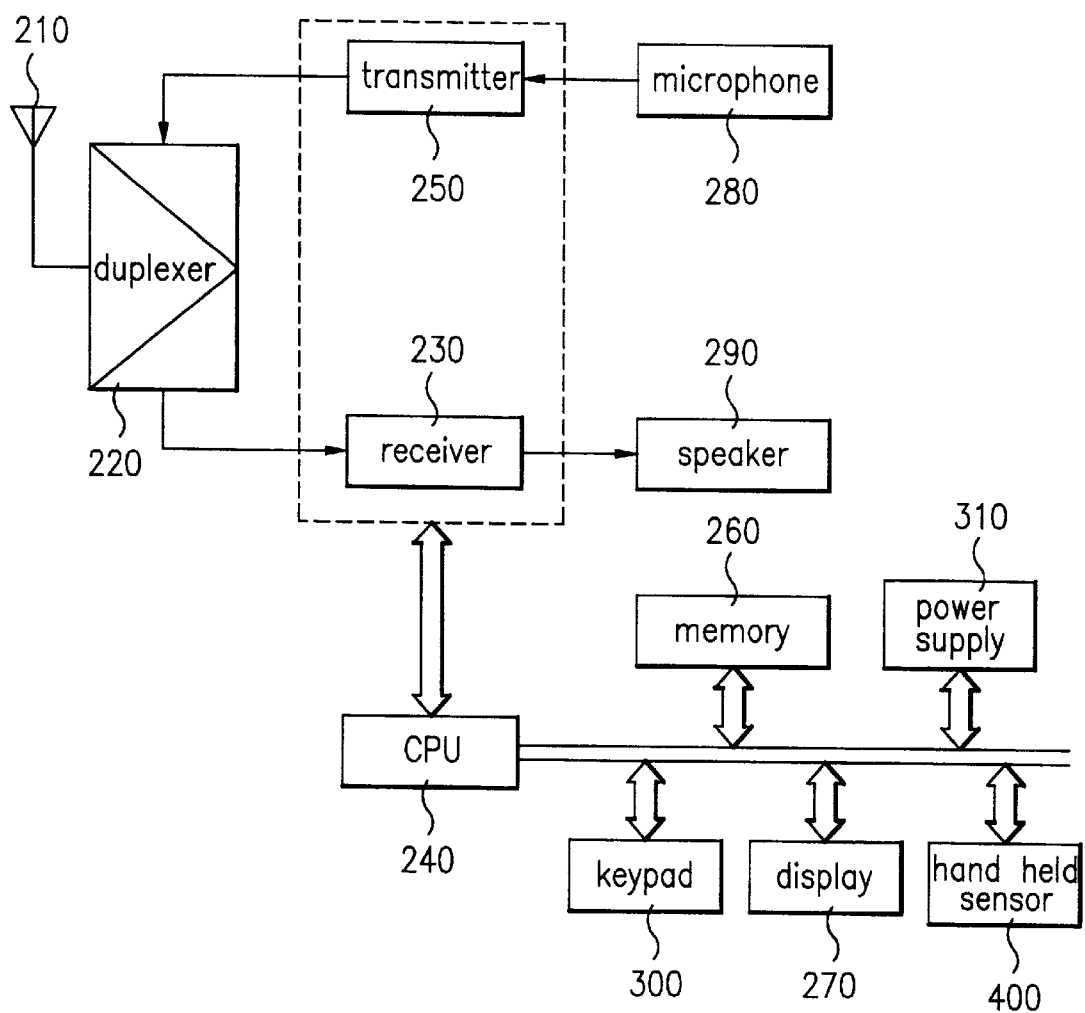
FIG. 2 is a block diagram of a cellular phone in accordance with the present invention.

FIG. 2 shows a cellular phone in accordance with the present invention. The construction of the cellular phone in FIG. 2 is substantially the same as a conventional cellular phone in FIG. 1, except the present cellular phone further comprises a hand-held state sensor 400. Accordingly, elements 210~310 functions in substantially the same manner as elements 10~110 described with reference to FIG. 1 above.

As shown in FIG. 2, the hand-held state sensor 400 is connected to the CPU 240. The hand-held state sensor 400 senses whether a user is holding the cellular phone and informs the CPU 240 the hand-held state of the cellular phone. The operation of the cellular phone with the hand-held state sensor 400 will next be described.

A call origination and termination operations of the cellular phone are performed in the same manner as described in reference to FIG. 1. Thus, a detailed description will be given with respect to the operations associated with the provision of a phone call service based upon sensing the hand-held state of the cellular phone in accordance with the present invention.

When a cellular phone rings while it is held in a user's hand, the hand-held state sensor 400 senses that the cellular phone is held in the user's hand and informs the CPU 240 of the sensed result. The hand-held state sensor 400 may be a temperature or touch sensor sensing the body temperature of the user, a pressure sensor sensing the pressure when the user holds the cellular phone, a fingerprint sensor sensing the user's fingerprint, a scanning beam interception sensor sensing whether a scanning beam emitted from the cellular phone is intercepted, or any combination of the sensors thereof. In the preferred embodiment, the hand-held sensor 400 is a combination of the temperature and pressure sensors.

Upon receiving a sensed signal from the hand-held state sensor 400 indicating that the user is holding the cellular phone, the CPU 240 automatically opens a speech path as if the user had input data to respond to the incoming call. Moreover, the user may terminate the phone call simply by letting go of the cellular phone, e.g. putting the phone in a pocket, purse, or table. That is, the hand-held state sensor 400 would sense that the cellular phone is not held and the CPU 240 automatically closes the speech path in response to the sensed result.

Figure 3:
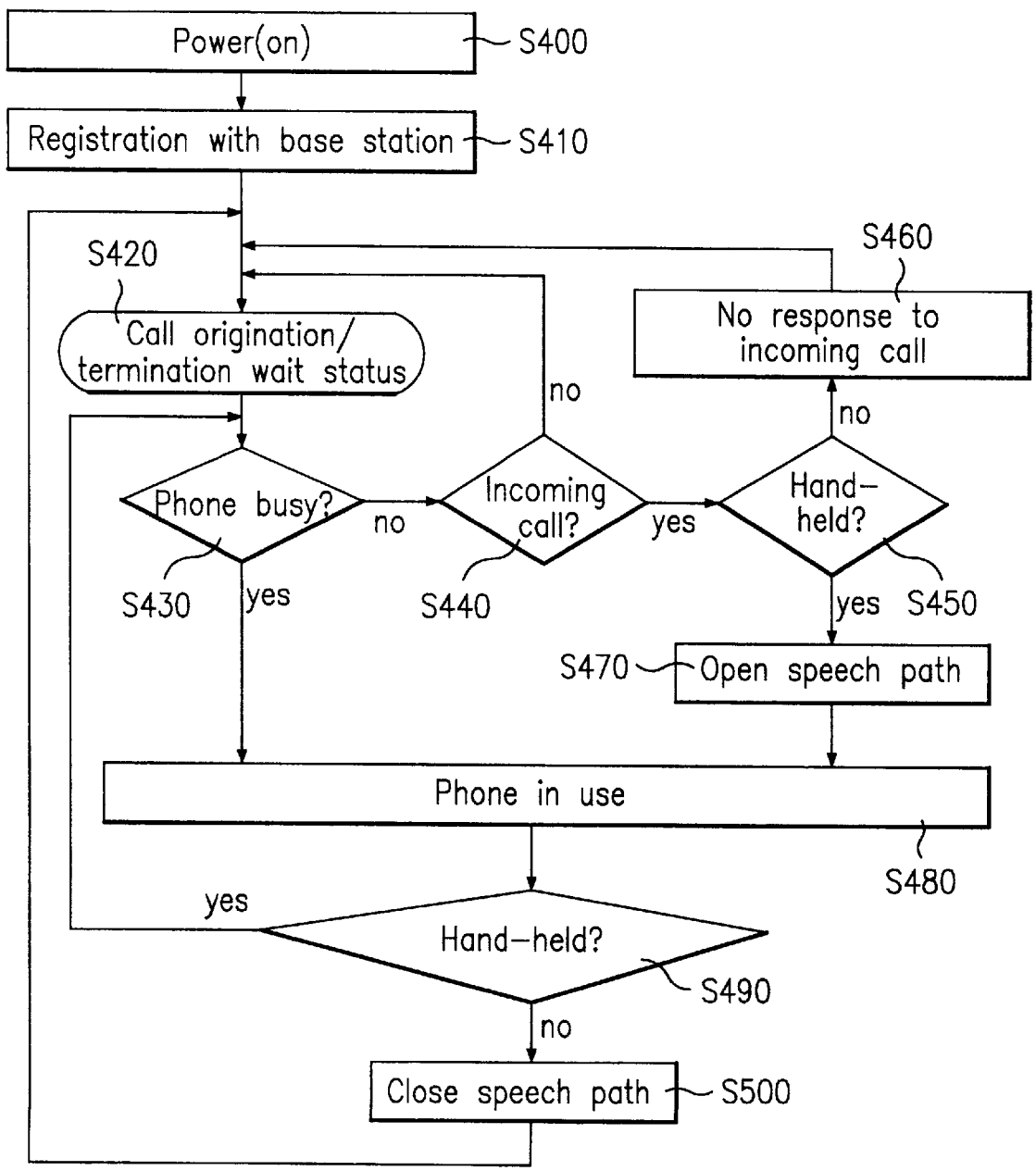
FIG. 3 is a flowchart of a method for providing a phone call service based upon sensing a hand-held state of the cellular phone in accordance with the present invention.

FIG. 3 is a flowchart illustrating a method for providing a phone call service based upon sensing the hand-held state of a cellular phone in accordance with the present invention.

Referring to FIGS. 2 and 3, if the power of a cellular phone is switched on (S400), the phone is registered with a corresponding base station to enable incoming and/or outgoing phone calls to the phone (S410). Unless the user begins to make a phone call, the CPU 240 enters a call origination/termination status (S420) under which the CPU 240 continuously checks whether the cellular phone is busy (S430).

If the cellular phone is busy, i.e. the user is making or receiving a call (S480), the CPU 240 determines whether the user is holding the cellular phone (S490). When it is determined that the user is no longer holding the cellular phone, the CPU 240 closes the opened speech path (S500) and returns to the call origination/termination wait status (S420).

If the cellular phone is not busy, the CPU 240 determines whether there is an incoming call (S440). When there is no incoming call, the CPU 240 returns to the call origination/termination wait status (S420). If there is an incoming call, the CPU 240 determines whether the user is holding the cellular phone (S450). Namely, the user may already be holding the phone or may pick up the phone.

If the user holds the cellular phone while the call comes in, the CPU 240 recognizes the hand-held state as a response to the incoming call and directly opens the speech path (S470). Unless the user removes the cellular phone from his/her hand, the speech path remains opened (S480). Thus, if the cellular phone is busy, the CPU 240 determines whether the user is holding the cellular phone (S490). When it is determined that the user is no longer holding the cellular phone, the CPU 240 closes the opened speech path (S500) and returns to the call origination/termination wait status (S420).

However, if the user is not holding or does not attempt to pick up the cellular phone while a call is coming through (S450), the CPU 240 determines that there is no response to the incoming call (S460) and returns to the call origination/termination wait status (S420).

Once the cellular phone enters the call origination/termination wait status, the cellular phone continuously maintains the call origination/termination wait status until the power of the cellular phone is switched off.

Moreover, because a user may wish not to receive and/or terminate a phone call by a hand-held sensor, the present invention may be implemented such that the sensor may be toggled on and off by the user. Namely, if the sensor is toggled off, the hand-held sensor 400 would be disabled and would not determine whether a user is holding the cellular phone. Accordingly, the CPU 240 would open or close a speech path based upon an affirmative input from a user to receive or terminate a phone call. Thus, the hand-held sensor would be an option or a mode of the cellular phone.

As described description, according to the present invention, an incoming call can be simply answered without any hassle of physically maneuvering the phone in a particular way, thereby allowing the user to receive a more convenient phone call service. Furthermore, the present invention can easily be implemented in phones of a trunked radio system (TRS), a personal communication service (PCS), a cordless phone 2 generation (CT-2) and general wire/wireless systems as well as a cellular phone of a mobile communication system.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method for providing a phone call service comprising:
    determining whether a phone is busy;
    determining whether a user is holding said phone if said phone is busy, and automatically closing an opened speech path when it is determined that the user is no longer holding said phone; and
    determining whether there is an incoming call if the phone is not determined to be busy, and determining whether a user is holding said phone if there is an incoming call and automatically opening a speech path if the user is holding said phone.

2. A method of claim 1, wherein determining whether a user is holding said phone by a sensor on said phone.

3. A method of claim 2, wherein determining whether a user is holding said phone if said sensor is toggled on.

4. A method of claim 2, wherein said sensor is at least one of a temperature sensor, a pressure sensor, a fingerprint sensor and/or a scanning beam interception sensor.

5. A method of claim 2, wherein said sensor is a combination of a temperature sensor and a pressure sensor.

6. An apparatus of claim 5, wherein said sensor senses whether a user is holding said phone either when there is an incoming call or when said phone is busy.

7. An apparatus of claim 6, wherein said sensor senses whether a user is holding said phone if said sensor is toggled on.

8. An apparatus of claim 6, wherein said CPU automatically opens a speech path if said sensor senses that the user is holding said phone when there is an incoming call.

9. An apparatus of claim 6, wherein said CPU automatically closes a speech path if said sensor senses that the user is no longer holding said phone when said phone is busy.

10. A method of claim 1, wherein said phone is one of a trunked radio system phone, a PCS phone, a cordless phone 2 generation or a cellular phone.

11. A phone comprising:
a CPU processing received data and processing data to be transmitted; and
a sensor connected to said CPU sensing whether a user is holding said phone and informing said CPU whether a user is holding said phone wherein the CPU opens/closes a speech path according to sensed data from said sensor.

12. An apparatus of claim 11, wherein said sensor includes at least one of a temperature sensor, a pressure sensor, a fingerprint sensor and/or a scanning beam interception sensor.

13. An apparatus of claim 11, wherein said sensor is a combination of a temperature sensor and a pressure sensor.

14. An apparatus of claim 11, wherein said phone is one of a trunked radio system phone, a PCS phone, a cordless phone 2 generation or a cellular phone.

* * * * *